US012374211B2

(12) United States Patent
Whitaker et al.

(10) Patent No.: US 12,374,211 B2
(45) Date of Patent: Jul. 29, 2025

(54) SYSTEMS AND METHODS FOR ALARM EVENT DATA RECORD PROCESSING

(71) Applicant: Noonlight, Inc., St. Louis, MO (US)

(72) Inventors: Nathan Whitaker, South Lake Tahoe, CA (US); Mike Roth, Webster Groves, MO (US); Zach Winkler, Dallas, TX (US); Joe Pritzel, Fort Worth, TX (US)

(73) Assignee: Noonlight, Inc., St. Louis, MO (US)

( * ) Notice: Subject to any disclaimer, the term of this patent is extended or adjusted under 35 U.S.C. 154(b) by 298 days.

(21) Appl. No.: 17/951,685

(22) Filed: Sep. 23, 2022

(65) Prior Publication Data

US 2023/0089720 A1 Mar. 23, 2023

Related U.S. Application Data

(60) Provisional application No. 63/247,613, filed on Sep. 23, 2021.

(51) Int. Cl.
*G08B 25/00* (2006.01)
*G08B 21/02* (2006.01)

(52) U.S. Cl.
CPC ........... *G08B 25/006* (2013.01); *G08B 21/02* (2013.01)

(58) Field of Classification Search
CPC .................. G08B 25/006; G08B 21/02; G08B 13/19613; G08B 13/19682; G08B 25/10; G08B 29/18
See application file for complete search history.

(56) References Cited

U.S. PATENT DOCUMENTS

| | | | |
|---|---|---|---|
| 5,742,233 | A | 4/1998 | Hoffman et al. |
| 6,044,257 | A | 3/2000 | Boling et al. |
| D453,167 | S | 1/2002 | Hasegawa et al. |
| 6,369,710 | B1 | 4/2002 | Poticny et al. |
| 6,434,702 | B1 | 8/2002 | Maddalozzo, Jr. et al. |
| 6,574,484 | B1 | 6/2003 | Carley |
| 6,710,771 | B1 | 3/2004 | Yamaguchi et al. |
| 6,826,120 | B1 | 11/2004 | Decker et al. |

(Continued)

FOREIGN PATENT DOCUMENTS

| | | |
|---|---|---|
| EP | 2264679 | 12/2010 |
| GB | 2508054 | 5/2014 |

(Continued)

OTHER PUBLICATIONS

Kelly, John et al., "911's Deadly Flaw: Lack of Location Data" USA Today, Feb. 22, 2015, Chapters 1-4, http://www.usatoday.com/story/news/2015/02/22/cellphone-911-lack-location-data/23570499/, 6 Pages.

(Continued)

*Primary Examiner* — Brian Wilson
(74) *Attorney, Agent, or Firm* — Fish & Richardson P.C.

(57) ABSTRACT

Improved systems and methods for providing a notification of an emergent condition using automation, artificial intelligence, visual recognition, and other logic to automatically suggest identifications and classifications of information in audiovisual or other multimedia data about an emergency or alarm and modify a rapid-response display and/or alarm handling workflow to expedite the dispatch of first responds to true emergencies and quickly filter and eliminate false alarms to reduce waste.

18 Claims, 6 Drawing Sheets

(56) References Cited

U.S. PATENT DOCUMENTS 6,853,302 B2 2/2005 Monroe
D506,208 S 6/2005 Jewitt et al.
7,098,787 B2 8/2006 Miller
7,164,921 B2 1/2007 Owens et al.
7,251,470 B2 7/2007 Faucher et al.
7,480,501 B2 1/2009 Petite
7,486,194 B2 2/2009 Stanners et al.
7,525,432 B2 4/2009 Jackson
D613,751 S 4/2010 Truelove et al.
7,750,799 B2 7/2010 Childress et al.
7,751,826 B2 7/2010 Gardner et al.
7,761,080 B2 7/2010 Banet et al.
7,920,891 B2 4/2011 Kwak
7,937,067 B2 5/2011 Maier et al.
8,050,386 B2 11/2011 Dickinson
8,106,820 B2 1/2012 Bennett et al.
8,116,723 B2 2/2012 Kaltsukis
8,116,724 B2 2/2012 Peabody
8,126,424 B2 2/2012 Piett et al.
8,185,087 B2 5/2012 Mitchell, Jr. et al.
8,195,121 B2 6/2012 Dunn et al.
8,208,889 B2 6/2012 McGary et al.
8,249,547 B1 8/2012 Fellner
8,295,801 B2 10/2012 Ray et al.
8,310,360 B2 11/2012 Ross, Jr. et al.
8,350,694 B1 1/2013 Trundle et al.
8,441,356 B1 5/2013 Tedesco et al.
8,484,352 B2 7/2013 Piett et al.
8,516,122 B2 8/2013 Piett et al.
8,538,374 B1 9/2013 Haimo et al.
8,538,375 B2 9/2013 Franz et al.
8,548,489 B2 10/2013 Iwamura et al.
8,565,717 B2 10/2013 Galuszka
8,600,337 B2 12/2013 Rothschild
8,620,841 B1 12/2013 Filson et al.
8,676,273 B1 3/2014 Fujisaki
8,705,702 B1 4/2014 Sieg
8,718,593 B2 5/2014 Singhal
8,744,397 B2 6/2014 Gee et al.
8,757,484 B2 6/2014 Fasoli et al.
8,768,294 B2 7/2014 Reitnour et al.
D711,920 S 8/2014 Stroupe et al.
D712,912 S 9/2014 Gee et al.
8,831,634 B2 9/2014 Wang
8,862,092 B2 10/2014 Reitnour
8,890,685 B1 11/2014 Sookman et al.
8,909,191 B2 12/2014 Pipes
8,929,853 B2 1/2015 Butler
D722,077 S 2/2015 Zhang et al.
8,957,774 B2 2/2015 Goldblatt
8,984,143 B2 3/2015 Serra et al.
8,988,215 B1 3/2015 Trundle et al.
D726,202 S 4/2015 Zurn
D726,216 S 4/2015 Tabata et al.
9,014,660 B2 4/2015 Pahlevani
D729,271 S 5/2015 Zhang et al.
9,071,957 B2 6/2015 Stadtlander et al.
9,171,450 B2 10/2015 Cho et al.
9,177,455 B2 11/2015 Remer
9,226,119 B2 12/2015 Suryavanshi et al.
9,226,321 B1 12/2015 Eddings et al.
D751,623 S 3/2016 Tsuruta et al.
9,294,610 B2 3/2016 Leonessi
D754,691 S 4/2016 Connolly et al.
9,354,776 B1 5/2016 Subramanian et al.
D759,662 S 6/2016 Panjabi
D762,656 S 8/2016 He et al.
D765,128 S 8/2016 Choi et al.
9,439,045 B2 9/2016 Kingsmill et al.
D768,702 S 10/2016 Ford
9,536,410 B2 1/2017 Hutz
9,547,963 B1 1/2017 Trundle et al.
D785,671 S 5/2017 Tursi et al.
D788,813 S 6/2017 Tursi et al.
D791,176 S 7/2017 Tursi et al.
9,919,599 B2 3/2018 Fuchiwaki et al.
D814,504 S 4/2018 Lee et al.
9,972,185 B2 5/2018 Hutz
D819,694 S 6/2018 Kim et al.
D820,305 S 6/2018 Clediere
9,997,042 B2 6/2018 Hutz
D828,394 S 9/2018 Li et al.
D834,055 S 11/2018 Connolly et al.
10,127,798 B1 11/2018 Trundle et al.
10,278,050 B2 4/2019 Winkler et al.
10,325,469 B2 6/2019 Hutz
10,332,387 B1 6/2019 Trundle et al.
D853,435 S 7/2019 Omernick et al.
D863,347 S 10/2019 Subramanian et al.
10,560,831 B2 2/2020 Winkler et al.
D878,385 S 3/2020 Medrano et al.
D878,411 S 3/2020 Lee et al.
10,728,732 B2 6/2020 Winkler et al.
D898,055 S 10/2020 Connolly et al.
D916,914 S 4/2021 Kim et al.
10,999,158 B2 5/2021 Kramar et al.
11,138,854 B2 10/2021 Hutz
11,699,337 B2 6/2023 Hutz
2003/0012344 A1 1/2003 Agarwal et al.
2003/0214411 A1 11/2003 Walter et al.
2004/0184584 A1 9/2004 McCalmont et al.
2004/0192276 A1 9/2004 Wesby et al.
2004/0203879 A1 10/2004 Gardner et al.
2006/0009240 A1 1/2006 Katz
2007/0083915 A1 4/2007 Janakiraman et al.
2009/0144387 A1 6/2009 Smith et al.
2009/0268030 A1 10/2009 Markham
2010/0015948 A1 1/2010 Nagano
2010/0097214 A1 4/2010 Sweeney et al.
2010/0099410 A1 4/2010 Sweeney et al.
2010/0289644 A1 11/2010 Slavin et al.
2011/0134240 A1 6/2011 Anderson et al.
2011/0230161 A1 9/2011 Newman
2012/0046044 A1 2/2012 Jamtgaard et al.
2012/0056742 A1 3/2012 Tedesco et al.
2012/0092158 A1 4/2012 Kumbhar et al.
2012/0105203 A1 5/2012 Elliot et al.
2012/0131186 A1 5/2012 Klos
2012/0225635 A1 9/2012 Esbensen
2012/0249787 A1 10/2012 Allegra et al.
2012/0329420 A1 12/2012 Zotti et al.
2013/0023247 A1 1/2013 Bolon et al.
2013/0120131 A1 5/2013 Hicks
2013/0130792 A1 5/2013 Crocker et al.
2013/0222133 A1 8/2013 Schultz et al.
2013/0231077 A1 9/2013 Cahill
2013/0281005 A1 10/2013 Causey et al.
2014/0057590 A1 2/2014 Romero
2014/0058567 A1 2/2014 Matsuoka et al.
2014/0066000 A1 3/2014 Butler
2014/0169352 A1 6/2014 Moir et al.
2014/0171100 A1 6/2014 Marti et al.
2014/0266669 A1 9/2014 Fadell
2014/0266702 A1 9/2014 Forster-Knight
2014/0306833 A1 10/2014 Ricci
2014/0316581 A1 10/2014 Fadell et al.
2014/0351732 A1 11/2014 Nasraoui et al.
2015/0009011 A1 1/2015 Cahill
2015/0038109 A1 2/2015 Salahshour
2015/0134451 A1 5/2015 Farrar et al.
2015/0277685 A1 10/2015 Shieh et al.
2015/0287306 A1 10/2015 Hallett et al.
2015/0288797 A1 10/2015 Vincent
2016/0029195 A1 1/2016 Leahy et al.
2016/0042637 A1 2/2016 Cahill
2016/0189510 A1 6/2016 Hutz
2016/0255197 A1 9/2016 Abnett et al.
2016/0269984 A1 9/2016 Hallet et al.
2016/0308858 A1 10/2016 Nordstrom et al.
2016/0321679 A1 11/2016 Dong et al.
2017/0011210 A1 1/2017 Cheong et al.
2017/0053507 A1 2/2017 Hutz
2017/0178480 A1 6/2017 Hutz
2017/0289350 A1* 10/2017 Philbin ................ G08B 25/016

(56) References Cited

U.S. PATENT DOCUMENTS

| | | | |
|---|---|---|---|
| 2018/0047230 A1 | 2/2018 | Nye | |
| 2018/0261064 A1 | 9/2018 | Hutz | |
| 2019/0327597 A1 | 10/2019 | Katz et al. | |
| 2020/0059776 A1 | 2/2020 | Martin et al. | |
| 2020/0126339 A1 | 4/2020 | Tamahashi et al. | |
| 2020/0126399 A1 | 4/2020 | Tamahashi et al. | |
| 2020/0244805 A1 | 7/2020 | Philbin | |
| 2020/0288295 A1* | 9/2020 | Martin | H04M 3/5116 |
| 2020/0396261 A1 | 12/2020 | Bhatia et al. | |
| 2021/0020007 A1* | 1/2021 | Vazirani | G08B 15/00 |
| 2021/0203887 A1 | 7/2021 | Nathan et al. | |
| 2021/0248884 A1 | 8/2021 | Dougan | |
| 2021/0289334 A1 | 9/2021 | Martin et al. | |
| 2022/0028237 A1 | 1/2022 | Hutz | |
| 2023/0078210 A1* | 3/2023 | Kolaxis | G08B 25/12 455/404.2 |
| 2023/0306834 A1 | 9/2023 | Hutz | |

FOREIGN PATENT DOCUMENTS

| | | |
|---|---|---|
| WO | 2015084252 A1 | 6/2015 |
| WO | 2015143077 A1 | 9/2015 |
| WO | 2016015082 A1 | 2/2016 |
| WO | 2016191497 A1 | 12/2016 |

OTHER PUBLICATIONS

International Search Report and Written Opinion for PCT/US16/34182 Issued May 26, 2015 7 Pages.

U.S. Pat. No. 00,365,42, Walton, Sep. 1862.

"Noonlinght, Formerly SafeTrek Mobile App: Smart Way to Alert Police When You're in Danger" Mar. 28, 2017, posted at youtube.com (site visited Feb. 21, 2023). https://www.youtube.com/watch?v=Sh7aWEIYaxk (Year: 2017).

Trademark Registration No. 1505785, Jul. 5, 1988 (publication date), Philips Export V.V. Corporation (registrant), Trademark Electronic Service Systemm (TESS), available at www.uspto.gov (Year: 1988).

European Search Report in European Application No. EP15876270, dated Jul. 4, 2018, 100 pages.

Extended European Search Report in European Appln. No. 24156967.2, mailed May 21, 2024, 8 pages.

International Preliminary Report on Patentability in International Appln. No. PCT/US2015/068089, mailed Jul. 13, 2017, 10 pages.

International Preliminary Report on Patentability in International Appln. No. PCT/US2022/044551, mailed Apr. 4, 2024, 6 pages.

International Search Report and Written Opinion in International Appln. No. PCT/US2015/068089 mailed Mar. 4, 2016, 15 pages.

Office Action in Australian Appln. No. 2015373990, mailed Jan. 20, 2021, 6 pages.

Office Action in Australian Appln. No. 2015373990, mailed Jul. 15, 2021, 10 pages.

Office Action in Australian Appln. No. 2015373990, mailed Mar. 10, 2020, 12 pages.

Office Action in Australian Appln. No. 2015373990, mailed Mar. 29, 2021, 5 pages.

Office Action in Australian Appln. No. 2017239565, mailed Nov. 23, 2018, 11 pages.

Office Action in Australian Appln. No. 2019222843, mailed Jan. 20, 2021, 5 pages.

Office Action in Australian Appln. No. 2019222843, mailed Mar. 30, 2021, 3 pages.

Office Action in Canadian Appln. No. 2,972,721, mailed Jun. 1, 2020, 10 pages.

Office Action in U.S. Appl. No. 14/984,117, mailed Nov. 7, 2016, 10 pages.

Scholar.google.com [online], Search Results, Apr. 10, 2024, 2 pages.

Korean Intellectual Property Office, International Search Report and Written Opinion for PCT Application PCT/US2022/044551, mailed Jan. 12, 2023, 9 Pages.

Extended European Search Report in European Appln. No. 22873642.7, mailed Nov. 12, 2024, 10 pages.

* cited by examiner

SYSTEMS AND METHODS FOR ALARM EVENT DATA RECORD PROCESSING

CROSS-REFERENCE TO RELATED APPLICATIONS

This application claims the benefit of U.S. Prov. Pat. App. Ser. No. 63/247,613, filed Sep. 23, 2021, the entire disclosure of which is incorporated herein by reference.

BACKGROUND OF THE INVENTION

Field of the Invention

This disclosure pertains to the field of emergency notification systems, and particularly to automated systems for providing notification of an emergency to appropriate first responders.

Description of the Related Art

Almost every American child is taught to call 9-1-1 in the event of an emergency. The 9-1-1 system is the result is a 1950s-era push by emergency responders for a national standard emergency phone number. Originally implemented through mechanical call switching, the 9-1-1 number is now used for most types of emergencies, including fire, police, medical, and ambulance.

The 9-1-1 system is implemented using dispatch centers known as public safety answering points or public safety access points, sometimes also known as PSAPs. A PSAP is essentially a call center that answers 9-1-1 calls and triages the emergency, either directly dispatching appropriate first responders, or contacting a dispatch office for the appropriate first responders.

For the PSAP call center to determine the proper first responder for the emergency, the PSAP operator typically must acquire some basic information from the caller. This information includes name, location, and a general description of the emergency. Thus, when a call is placed to 9-1-1, the PSAP operator generally asks the caller for that information. This is because the 9-1-1 system was designed during the landline era, and its technology is based on landline systems. Most modern PSAPs are capable of using call data to determine the origin of 9-1-1 calls placed over a landline. But the vast majority of 9-1-1 calls are now placed using mobile phones, which provide advantages over the old 9-1-1 system, including access to geolocation data, motion and movement data, imaging systems, and integrations with other devices that provide expanded functionality, such as smart watches and other wearable computers, as well as smart home systems and personal security and monitoring systems. Through technology integrations, data from these disparate systems can be routed to PSAPs and/or emergency responders to improve both the quality and timeliness of the emergency response, and artificial intelligence is increasingly being deployed to provide faster, automated threat detection and classification.

However, these improvements are not without their shortcomings. Artificial intelligence systems, for example, can be trained to process information, but they lack knowledge, such as contextual information not present in the specific data they are trained to process and classify, which could improve the accuracy of their classifications.

Additionally, time is of the essence in an emergency situation. Crucial time can be lost in the process of identifying and dispatching an emergency responder, and every extra second could mean the difference between a positive outcome and a tragedy. To avoid false positives, many personal safety systems confirm the emergency with the user before notifying emergency responders, but in some cases, the emergency status can be determined from available data and confirmation may not be only unnecessary, but costly.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described here, among other things, is a method comprising: providing a case management server communicably coupled to a telecommunications network and configured to execute an alarm handling workflow comprising: in response to the case management server receiving an alarm data record via the telecommunications network, creating, at the case management server, a case management data record comprising the alarm data record and a case identifier; transmitting to a PSAP computer, via the telecommunications network, the case identifier; in response to receiving, via the telecommunications network, a request to access the case management data record associated with the case identifier, the request including the case identifier, displaying, via the telecommunications network, a rapid-response user interface comprising one or more visualizations of the case management data record; receiving, at the case management computer via the telecommunications network, an alarm data record comprising: a notice of a triggered alarm; and an indication of a multimedia data feed related to the triggered alarm; and based on an analysis of the multimedia data feed, the case management computer executing a modified alarm handling workflow based on the configured alarm handling workflow.

In an embodiment of the method, the received alarm data is transmitted to the alarm handling computer by a residential computer disposed at a residence in response to the residential computer detecting the presence of a human in the residence.

In an embodiment of the method, the residential computer is a smart home device.

In an embodiment of the method, the smart home device is a security camera.

In an embodiment of the method, the alarm data further comprises an indication of an emergency type.

In an embodiment of the method, the emergency type comprises an unauthorized intruder emergency.

In an embodiment of the method, the indication of a multimedia feed comprises an Internet address at which the multimedia feed can be downloaded or viewed.

In an embodiment of the method, the modified alarm handling flow comprises: receiving, at the case management server, an indication of images of one or more other persons authorized by the end user to enter the residence; the analysis of the multimedia data feed comprising: detecting in the multimedia feed the presence of at least one human subject; comparing the detected at least one human subject to each of the images to determine whether each of the detected at least human subjects is one of the persons authorized by the end user to enter the residence, and, for each such detected at least one human subject, calculating a confidence score associated with the determination; if any one of the calculated confidence scores does not exceed a predefined confidence threshold, executing the configured alarm handling workflow.

In an embodiment of the method, the modified alarm handling flow further comprises: if all of the confidence scores exceed the predefined confidence threshold, executing the configured alarm handling workflow, wherein the displayed rapid-response user interface comprises a visualization of the multimedia video feed.

In an embodiment of the method, the displayed rapid-response user interface comprises: an indication of the at least one detected human subjects for which the confidence score exceeded the predefined confidence threshold; and an indication of the at least one detected human subjects for which the confidence score did not exceed the predefined confidence threshold.

In an embodiment of the method, the displayed rapid-response user interface comprises, for each human subject in the at least one detected human subject, a best match image of the at least one images based on the confidence score.

In an embodiment of the method, the displayed rapid-response user interface comprises, for each human subject in the at least one detected human subject, the confidence score associated with the best match image.

In an embodiment of the method, the displayed rapid-response user interface comprises, for each human subject in the at least one detected human subject, the confidence score associated with the best match image.

In an embodiment of the method, the modified alarm handling flow comprises: receiving, at the case management server, an indication of an identification of each of the persons shown in the photos and authorized by the end user to enter the residence; the displayed rapid-response user interface comprises, for each human subject in the at least one detected human subjects, the identification.

In an embodiment of the method, the displayed rapid-response user interface is displayed to a call center operator.

In an embodiment of the method, the method further comprises: the call center operator communicating with the end user to confirm that each of the detected human subjects is authorized to be in the residence; in response to the confirming, the call center operator manipulating the displayed rapid-response user interface to categorize each of the human subjects as authorized to enter the residence.

In an embodiment of the method, the facial recognition software comprises an artificial intelligence model.

In an embodiment of the method, the categorization is used to train the artificial intelligence model.

In an embodiment of the method, the modified alarm handling flow comprises: receiving, at the case management server, an indication of calendar data comprising dates and times when the persons authorized by the end user to enter the residence are authorized to enter the residence; if all of the confidence scores exceed the predefined confidence threshold and any one of the detected humans is determined, based on the calendar data, not to be authorized to be in the residence at the present time, executing the configured alarm handling workflow, wherein the displayed rapid-response user interface comprises an indication of those of the at least one detected human subjects for which the at least one detected human is determined, based on the calendar data, not to be authorized to be in the residence at the present time.

In an embodiment of the method, at least one image in the one or more images is an image of the end user.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

At a high level of generality, the systems and methods described herein are improvements upon systems and methods described in U.S. Pat. Nos. 10,278,050, 10,728,732, and 10,560,831, the entire disclosures of which are incorporated herein by reference, particularly with respect to the description of the flow of data among the various component systems, and to alarm triggering and alarm handling workflows.

Figure 1:
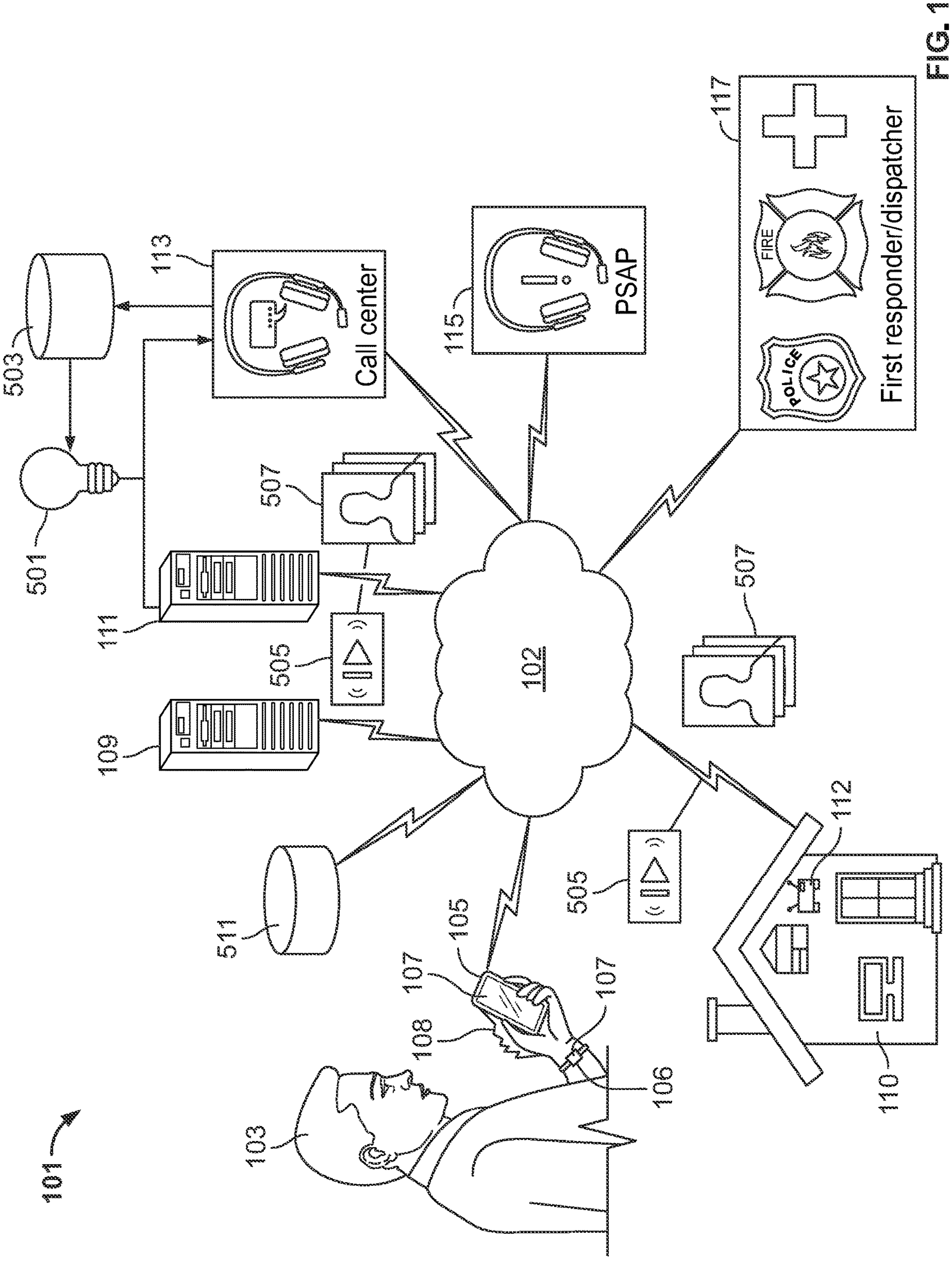
FIG. 1 provides a schematic diagram of an embodiment of systems and methods for providing emergency assistance according to the present disclosure.
Figure 2:
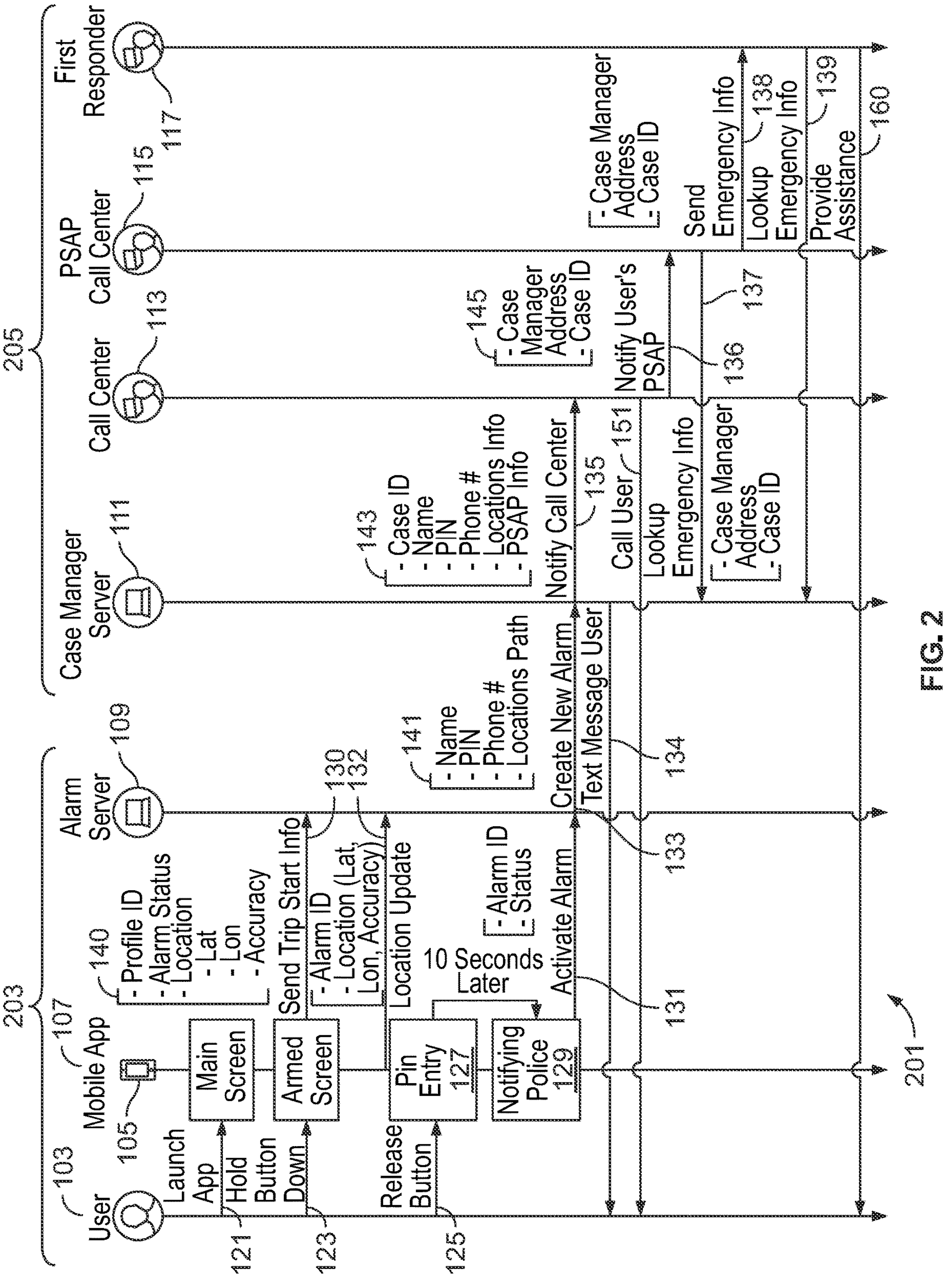
FIG. 2 provides a data flow diagram of an embodiment of an alarm triggering workflow and an alarm handling workflow for responding to an emergency.

FIG. 1 depicts a schematic diagram of a system (101) suitable for implementing the methods described in the present disclosure. FIG. 2 depicts an exemplary flow (201) of data and communications among the various components of the system (101), such as, but not limited to, the system (101) depicted in FIG. 1, during normal operations. As discussed elsewhere in this disclosure, this typical flow (201) of data may be augmented, altered, or changed to implement the technological improvements contemplated here.

The depicted system (101) of FIG. 1 includes a user (103) having a user device (105), depicted in FIG. 1 as a smart phone (105). The depicted user (103) is also wearing a wearable computer device (106), in this case, a smart watch (106). The smart watch (106) may be tethered (108) or otherwise connected to the user device (105), such as through a wireless communications protocol. By way of example and not limitation, this protocol may be a short-range radio protocol, such as Bluetooth®. As will be understood by a person of ordinary skill in the art, either or both the user device (105) and wearable device (106) may be, essentially, small portable computers having, among other things, storage, a memory, a user interface, a network interface device, and a microprocessor. Software applications (107) stored on the storage and/or memory are executed on the microprocessor. Although a smart phone (105) and smart watch (106) are shown, other computers could also be used, including, without limitation, computers integrated into other mobile technologies, such as vehicular navigation and telematics systems. The user device (105)

and/or wearable device (106) are typically communicably coupled, directly or indirectly, to the public Internet (102), through which they are also communicably coupled to other devices accessible via the Internet (102).

Additionally and/or alternatively, the systems and methods described herein may use residential computers (110), such as, but not necessarily limited to, smart home automation systems, home security systems, and other home computer systems (110) such as personal computers, smart speakers, smart displays, smart televisions, and the like. Such computers (110) are generally communicably coupled to the Internet (102). This may be through a home network device (112), such as a cable modem, DSL modem, or the like, or using a cellular data system. Such residential computer systems (110) are thus also communicably coupled to other devices accessible via the Internet (102).

Although a single family home is shown in FIG. 1, it will be clear to a personal of ordinary skill in the art that this may be any type of residence or dwelling, including but not limited to a single family home, apartment, condominium, duplex, villa, townhome, residence hall, and the like. The common characteristic of "residential computers" (110) as used herein is that they are normally located and used within a residence or dwelling, and usually have access to the Internet (102) via a network device (112) which is also normally located within or associated with the residence (e.g., a home router, a router serving a plurality of dormitory rooms, a wireless router serving a plurality of apartments, etc.).

FIG. 2 depicts the typical data flow in an embodiments of the systems and methods described in U.S. Pat. Nos. 10,278,050, 10,728,732, and 10,560,831. In the depicted embodiment, the user (103) generally uses the system (101) by first installing an application (107) on the user device (105), wearable device (106), and/or residential computer(s) (110), and sets up a user account. The user (103) may also link this account to other user accounts for related or integrated services, such as a home security system or home automation system. The account creation process typically includes the collection of user profile data about the user, such as name and password. Further user profile data may also be collected or provided, such as, but not necessarily limited to, date of birth, age, sex/gender and/or gender identity, as well as information that may be useful to emergency responders attempting to locate or assist the user (103), such as a photo or physical description of the user (103), and/or information about medical conditions the user (103) may have.

For purposes of the present disclosure, the "alarm workflow" described in U.S. Pat. Nos. 10,278,050, 10,728,732, and 10,560,831 and shown in FIG. 2 serves as a common trigger related to the various methods described herein. An embodiment of the overall data workflow (201) is depicted in FIG. 2, showing the process by which an alarm is triggered, and the process of by which a triggered alarm is answered. Conceptually, the workflow (201) can be thought of as being divided into two logical systems that are separable, but which can communicate with each other: an alarm triggering workflow (203), and an alarm handling workflow (205). This facilitates the ability to provide a uniform alarm handling workflow (205) for a plurality of distinct and otherwise unrelated alarm triggering workflows (203). The alarm triggering workflows (203) can thus be implemented in alarm applications from different, unrelated technology vendors, while all sharing a common alarm handling workflow (205). Thus, a given technology vendor or supplier can implement its own independent application (107) for use on a user device (105), a residential computer (110), or otherwise, along with its own corresponding alarm server (109), including its own independent program logic and alarm triggering workflow (203) for determining what constitutes an alarm that requires handling, and then dispatch the alarm to a third party case management server (111) to confirm and respond to the emergency condition in an alarm handling workflow (205). This may be done by exposing an application programming interface ("API") or providing a software development kit ("SDK") to allow applications (107) and/or alarm servers (109) to interoperate with the case manager server (111).

In the depicted embodiment of FIG. 2, an alarm server (109) manages the alarm triggering workflow (203), and a case manager server (111) manages the alarm handling workflow (205) (e.g., confirmation of an emergency, dispatching a first responder, etc.). Once an alarm is triggered, regardless of how, an alarm handling workflow (205) is launched by transmitting data about the alarm and/or triggering event (referred to herein as "alarm data") to a case manager server (111). The alarm data may be generated by an alarm server (109) handling an alarm received from a user device (105), wearable device (106), or residential computer (110), or the case management server (111) could receive the alarm data directly, such as from a user device (105), wearable device (106), or residential computer (110). Alternatively, the case management server (111) may receive the alarm data through a combination of these, or through another workflow or source.

The depicted case manager server (111) receives the alarm data and creates a case data structure (143) in a memory associated with the case manager server (111). The case data structure (143) contains the contents of the received alarm data, and the case management server (111) assigns or associates with the received alarm data and resulting case data structure (143) a unique case identifier, referred to herein as a "case ID." The data in the case data structure (143) is generally referred to herein as "case data." The case ID is used to efficiently communicate critical information about the user (103) and the emergency to a PSAP (115) and/or first responder (117).

In an embodiment, the alarm handling workflow (205) may include a step for manual confirmation of the triggered alarm. By way of example and not limitation, the case manager server (111) may transmit (135) to a call center (113) a data structure including some or all of the case data (143). When the call center (113) receives the case data (143), an operator may be notified via a computer interface on a call center computer, and the operator may then communicate with the user (103). This may be done through the device that triggered the alarm (e.g., the mobile device (105), wearable device (106), or residential computer (110)), or through another device associated with the user (103). This other device contact information may be included in the user profile data, provided as part of the alarm data, may be in the call center (113) records for the user (103) due to a prior alarm handling workflow (205) involving the user, or may be provided by a third party, as described elsewhere herein. The operator may attempt to contact the user (103) such as by text messages, a phone call, or another communications application, to confirm that the triggered alarm is a true emergency circumstance. If the user (103) responds and confirms safety, the case may be closed and no further action need be taken.

Figure 4:
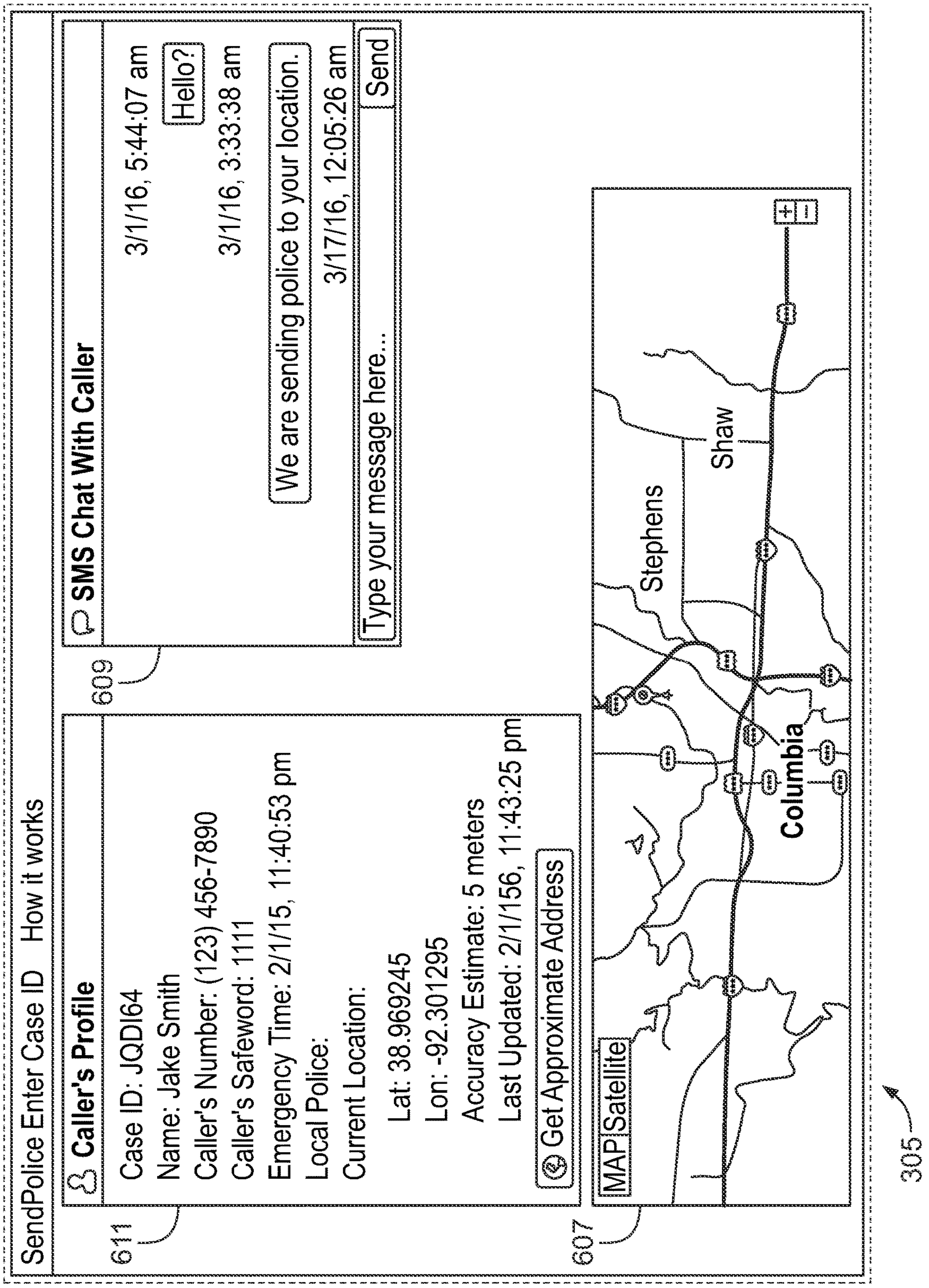
FIG. 4 provides an embodiment of a rapid response case management interface according to the present disclosure.

However, if the user (103) confirms an emergency, or does not respond within a certain amount of time, the call center (113) may escalate, ultimately transferring the case to an appropriate PSAP (115) to handle the emergency. This is preferably done by calling the appropriate PSAP (115) or first responder (117), or via an electronic transfer interface. In an embodiment, both are done, using a rapid-response interface accessible to both the PSAP (115) and first responder (117) through which the available case data (143) is made available to both. A non-limiting, exemplary embodiment of such an interface (305) is depicted in FIG. 4.

Figure 3:
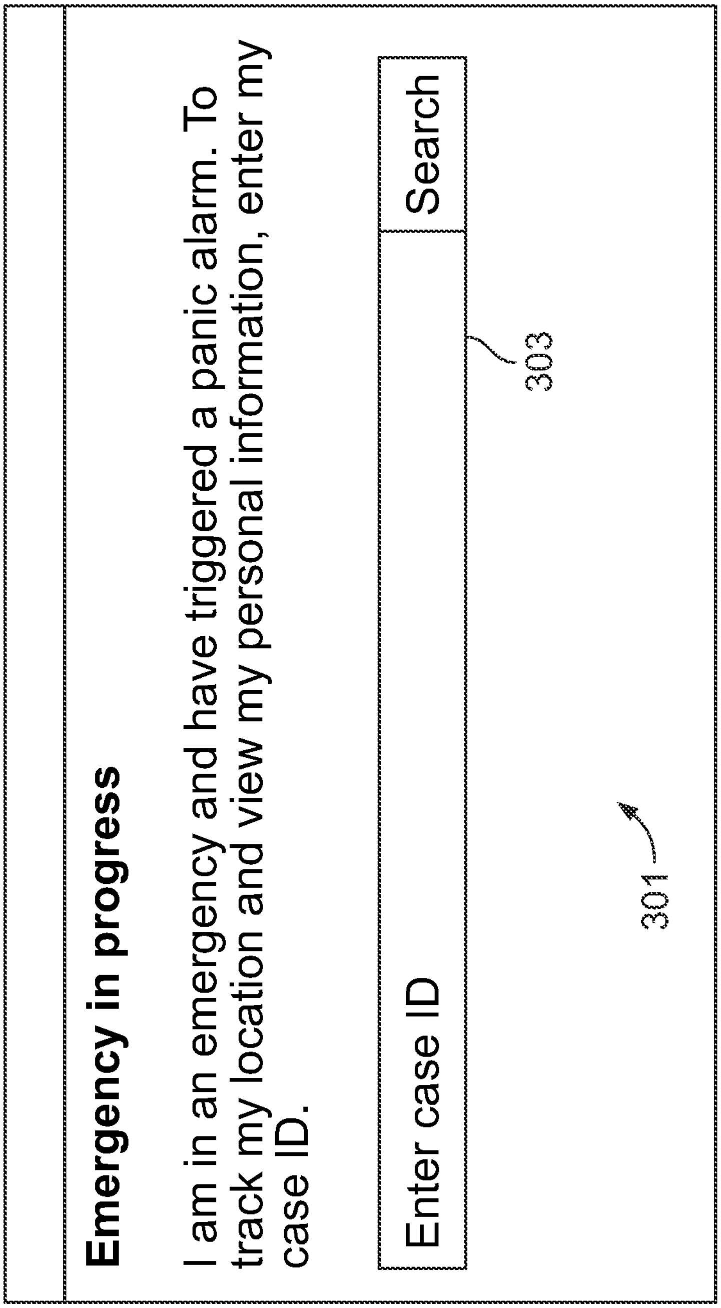
FIG. 3 provides an embodiment of an interface for supplying a case identification number to a rapid response interface according to the present disclosure.

In such an embodiment, once the call center (113) operator has begun a voice call (136) with the PSAP (115) operator, the call center (113) operator instructs the PSAP (115) operator to connect (137) the PSAP (115) operator's computer to an external interface of the case manager server system (111), such as a web site having a rapid-response interface. The PSAP (115) operator loads the rapid-response interface in a browser, and the call center (113) operator verbally provides to the PSAP (115) operator the case ID associated with the case data (143). A non-limiting, exemplary embodiment of an interface (301) for entering the case ID is depicted in FIG. 3. The PSAP (115) operator enters the case ID into an interface component (303) of the interface (301). The case ID is then used to retrieve from the case manager server (111) the case data structure (143). The case data in the structure (143) is then used to populate a rapid-response interface (305) components, providing a visual indication to the PSAP (115) operator of the case data. The interface (305) may further provide a map (607) of the location data, allowing the PSAP (115) operator to rapidly pinpoint the location. Because the case data includes the user's (103) name, phone number, and location data, time is not wasted verbally communicating information that is more efficiently communicate textually or visually. Other available information about the user (103) may also be visually depicted in the interface (305), as described elsewhere herein.

At this point, the emergency has generally been handed off to the PSAP (115) operator and is handled according to the standards and protocols established for the 9-1-1 system, though the call center (113) operator may continue to monitor the situation and provide further assistance as needed. Typically, under 9-1-1 operating procedure, the PSAP (115) contacts (138) the first responder (117), usually via a voice call to the first responder (117) dispatcher, and verbally provides the first responder (117) with the information needed to dispatch appropriate personnel to handle the emergency. The PSAP (115) operator may also use the case manager system (111) to communicate the information clearly and effectively, by providing the case ID to the first responder (117), who can then look the case up using the interface (301) in the same manner as the PSAP (115). Once the first responder (117) has the information needed to handle the emergency, whether provided verbally by the PSAP (115) operator over the voice call, or acquired via the rapid-response interface (305), the first responder then provides assistance (160) to the user (103) according to normal emergency management procedure.

The workflow described above, up to the point that alarm data is submitted to the case management server (111), can be generally thought of as the "alarm triggering workflow" (203), and the workflow after the case management server (111) receives the alarm data can be generally thought of as the "alarm handling workflow" (205).

In certain embodiments, the alarm data may provide, or make available to, the case management server (111), and the rest of the alarm handling workflow (205), various additional data or information that can be used to improve the overall system to reduce the incidence of false alarms, hasten response time during true emergencies, enhance the speed and responsiveness of the alarm handling, and provide other features that improve performance and overcome technical limitations of individual devices.

Figure 5:
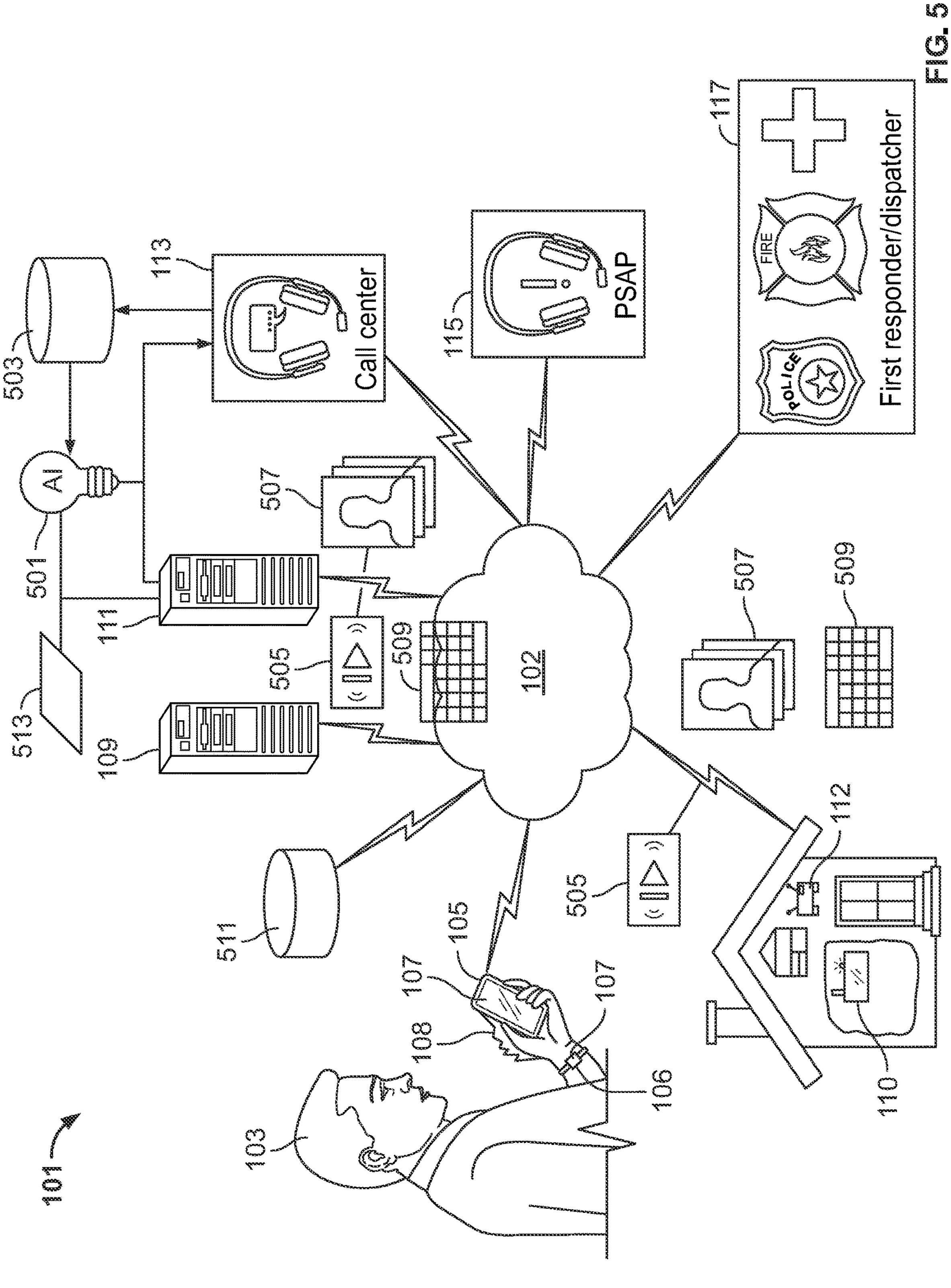
FIG. 5 provides an alternative embodiment of systems and methods for providing emergency assistance according to the present disclosure.

An exemplary embodiment is depicted in FIG. 5, which shows a system (101) in which the residential computer (110) is a smart home device, such as a security camera (110) or video camera (110), depicted as monitoring the front entrance to the home. The camera (110) may be enabled continuously, or may be triggered by a motion sensor, timer, smart door lock, or other device. When a person enters the home, the camera (110) records video data (505) of the person entering the home.

Figure 6:
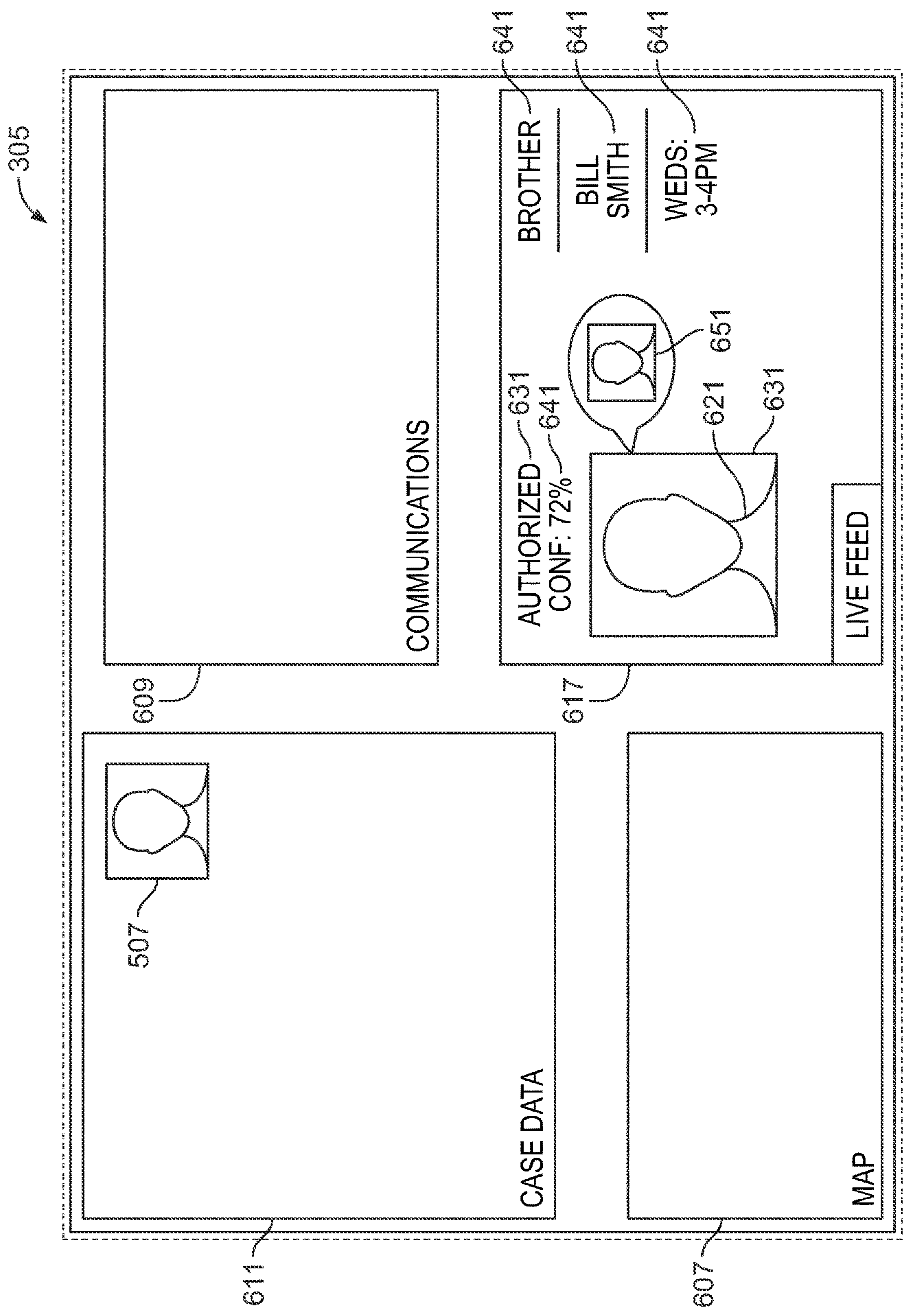
FIG. 6 provides an alternative embodiment of a rapid response case management interface according to the present disclosure.

From this point, the camera vendor may define or implement an alarm triggering workflow (203). Any number of possible workflows could be used. By way of example and not limitation, the camera (110) could arm or trigger a home security system alarm, which the user must disable within a specified amount of time, or an alarm is triggered (i.e., alarm data about the incident is sent to a case management server (111)). If the alarm is triggered, the alarm data may indicate the nature of the emergency as a potential intruder and include information usable by other computers in the system to view the video feed (505) in real-time, such as a URL of a third-party system (e.g., a web site managed by the manufacturer of the camera (110) or the home security system) from which the video feed (505) can be accessed and streamed. When the triggered alarm reaches the call center (113), the camera video feed (505) may be retrieved and displayed (617), such as to a call center (113) operator, and updated in real-time, and may likewise be made available, and updated in real-time, for the PSAP (115) and first responder (117) in the rapid-response interface (305). A non-limiting, exemplary embodiment is depicted in FIG. 6.

In an embodiment, various techniques may be used to identify false alarms and minimize the unnecessary escalation of such alarms. By way of example and not limitation, the alarm data may include a photograph (507) of the user (103), or may provide a URL or other address where such a photograph (507) may be accessed. When the case reaches the call center (113), the photograph (507) of the user (103) may be displayed to the operator (such as in the embodiment of FIG. 6), who can compare the photograph (507) to the person depicted in the video stream (505) to visually confirm that the "intruder" is in reality the user (103).

However, if the video stream (505) contains an indication of a potential emergency, such as the user (103) being in obvious medical distress, or the presence of another person, or the fact that the user (103) did not disable the alarm, and the operator may nevertheless proceed with an alarm handling protocol (205), such as by verifying safety and/or dispatching the case to the PSAP (115). In circumstances where the operator determines that the situation is highly urgent, or that attempting to contact the user (103) may escalate the situation, the operator may elect to skip confirming safety and dispatch the case directly to the PSAP (115).

In an alternative embodiment, facial recognition technology may be used to confirm that the person depicted in the video feed is not an intruder. For example, the photograph (507) of the user (103) may be accessible by the camera (110) or alarm server (109), and facial recognition technology may be applied to the video feed (505) during the alarm triggering workflow (203) to automatically determine that the person shown in the video feed (505) entering the home is the user (103). In this situation, no alarm handling workflow (205) need be generated at all.

However, this type of implementation is not preferred for a number of reasons. Facial recognition and other such technologies are known in the art and are generally implemented through the use of training. Stated simply, this is a process by which a computer program is provided examples of data that meets predefined criteria, and examples of data that does not, and the computer software uses statistical algorithms and techniques to identify artifacts in the data that are strongly correlated with one category or the other. When new, uncategorized data is provided, the software examines the new data to look for such artifacts in it, and, based on how strongly those artifacts match previously seen artifacts, guess which category the new data belongs to. Thus, with facial recognition, factors such as the positions, size, shape, and ratio of common facial features are suggestive of a person's face, and data that lacks those elements is not. However, this image processing lacks knowledge; that is, the ability to draw contextual inferences. For example, if an intruder were to open the door, and then hold up for the camera the album cover for Sgt. Pepper's Lonely Hearts Club Band, the camera would dutifully recognize the faces of the Beatles in the image and correctly determine that none of them are the user (103), and trigger an alarm because the AI doesn't "know" that the dated image is a photograph taken more than 50 years ago.

Returning to the use of facial recognition within the alarm triggering workflow (203), while the use of facial recognition as part of this workflow may provide a first-level filter, it is susceptible of circumvention and avoidance. Accordingly, this technology is better utilized during the alarm handling workflow (205), taking advantage of the availability of a human operator at the call center (113) to review and confirm the data and make judgment calls where AIs cannot. This also provides the alarm handling workflow system the ability to develop a database of knowledge that can be used to both improve the accuracy and speed of intruder identification across all alarm triggering workflows (203) that utilize the alarm handling workflow (205), and provide analytical and predictive tools to law enforcement, as described in further detail herein.

In the depicted embodiment of FIG. 5, a facial recognition engine or module using a trained artificial intelligence (AI) software system (501) is utilized as part of an overall feedback loop that can both provide enhanced identification of authorized users (103), enhanced identification of authorized users (103), automatic identification of an intruder, and law enforcement support tools. In the depicted embodiment, when an alarm is triggered, video data (505) captured by the camera (110) is made available at the call center (113). As part of the alarm handling workflow (205), an operator at the call center (113) examines the alarm data, including the video stream (505).

Additionally, the facial recognition module (501) examines the video stream (505) and attempts to recognize individual humans (621) in the video stream (505). For each human (621), the facial recognition module (501) also attempts to determine whether the detected human (621) is authorized to be in the home. Additionally and/or alternatively, the facial recognition module (501) may attempt to determine whether each detected human (621) is an unauthorized intruder. Additionally and/or alternatively, if the facial recognition module (501) cannot determine whether each detected human (621) is authorized to be in the home, or is an unauthorized intruder, the facial recognition module (501) may flag the detected individual (621) as having an unknown or indeterminate status.

This may be done through a number of techniques. By way of example and not limitation, the call center (113) may receive or have access to image data, such as photographs (507), depicting the user (103), and/or image data (507) depicting other persons (or even animals, such as pets) authorized by the user (103) to enter the house. This information may be made available at the call center (113) through a number of methods, including, but not necessarily limited to: by being included in user profile data that is stored or received by the call center (113); by being provided with the alarm data that triggers the alarm handling workflow (205); or by being made available to the call center in connection with the alarm data, such as by providing a URL or other resource locator from which the image data (507) can be accessed or downloaded. Other techniques may also be used in an embodiment.

The facial recognition module (501) then examines the video stream (505) and compares each identified human (621) in the video stream (505) to each of the one or more photographs (507) associated with the user (103) to determine whether any of the persons (621) depicted in the video stream (505) match any of the authorized persons for whom photographs (507) are available. In an embodiment, any detected matches (621) may be visually indicated (631) via the graphical user interface, including that displayed to the operator at the call center (113), and/or the PSAP (115) and/or first responder (117), such as via the rapid-response interface (305).

By way of example and not limitation, this may be done by applying an overlay layer (631) to the video stream which contains text identifying that individual (641). This text (641) may be moved in synchronization with the video stream (505) to remain located near the identified person. In an embodiment, the text (641) may include the person's name, relationship to the user, and/or a confidence score based on the strength of the match from the facial recognition module (501). This confidence score may be updated over time as more data is gathered by the video stream (505), which may be further provided to the facial recognition module (501) to refine and update the matches and confidence scores for the matches. By way of further example and not limitation, this overlay may include a thumbnail (651) of the matched person's photograph (507), providing the operator with the ability to quickly confirm the accuracy of the match, or, where there is no much of sufficient confidence level, the best available match.

Additionally, and/or alternatively, other visual indications may be provided to assist the operator in rapid visual assessment of the situation. By way of further example, a color-coding system may be implemented, such as by using green hues to represent matches for authorized users, red hues to represent matches for unauthorized users, and yellow hues to represent uncertain matches or unrecognized persons. These hues may be selected using a gradient system that corresponds to the confidence score, allowing the operator to not only quickly assess which persons in the video stream have been matched, but how strong that match is, without having to read and monitor the confidence scores.

In the depicted embodiment of FIG. 5, a person depicted in the video stream (505) is categorized as authorized only if that person matches an authorized person's photograph (507) to a specified degree of confidence. This confidence threshold may be set by anybody, and may be customized by the user. That confidence threshold may be included in the alarm data received by the case management server (111)

and used to determine which facial recognition (501) matches are authorized and which are unauthorized or indeterminate.

In the depicted embodiment, the operator assesses the visual information on the display and, even if all appears to be well, may contact the user (103) as described elsewhere herein to confirm that there is no emergency. During this process, the user (103) may identify other persons shown in the video feed (505), or the operator may ask if the user (103) wishes to do so, or if the other persons wish to be identified. The operator may then use the identification information provided during the safety confirmation step to categorize the data in the video feed (505). For example, the operator may be able to manipulate the graphical user interface to confirm that matched persons were a correct match, indicate that a match is incorrect, and/or indicate the correct identity of a depicted person. This is effectively training data for the facial recognition module (501), and may be provided back to the facial recognition module (501)'s training or source database (503) to further train and refine the facial recognition module (501).

In an embodiment, the user (103) may also take the opportunity of the contact with the call center to add authorized users to the user's (103) authorized user list. The video feed (505) of the users in question can be used as the photograph or image data (507) of the new user for future invocations of the alarm handling workflow for the user (103).

Although the foregoing is described with respect to a camera (110) in a residence, the same concept could be applied to other sources of video data, such as the camera on a mobile device (105), or a video feed received from a first responder (117), such as a police body camera or ambulance dash camera.

In an embodiment, this method may be further refined using calendaring or scheduling data (509). In such an embodiment, specific authorized users may be authorized only on certain days or during certain times. This calendaring or scheduling data (509) may be configured by the user (103) and received by the call center (113) through a number of methods, including, but not necessarily limited to: by being included in user profile data that is stored or received by the call center (113); by being provided with the alarm data that triggers the alarm handling workflow (205); or by being made available to the call center (113) in connection with the alarm data, such as by providing a URL or other resource locator from which the calendar data (509) can be accessed or downloaded. Other techniques may also be used in an embodiment. This information may also be displayed in a visualization to the operator, PSAP (115), and/or first responder (117), such as via the rapid-response interface (305).

In an embodiment utilizing scheduling data, the facial recognition module (501) matches a person detected in the video stream (505) to an authorized user photograph (507) as described elsewhere herein, and conducts an additional step of checking the date and time at the address where the camera (110) is located, and comparing that to a schedule of authorized dates and times in the calendar data (509) associated with the detected person. If the detected person is not authorized, per the calendar data (509), to be at the residence during the present date and time, the person may be categorized as an intruder and the normal alarm handling workflow (205) may be used. Alternatively, depending on the relationship to the user (103), or when the authorized time window opens or closes, the workflow may be modified. For example, if the detected person is identified in configuration data (or otherwise) the user's (103) mother, and she is authorized to be at the residence beginning at 3:00 pm on weekdays, but it is 2:58, ordinary human judgment suggest that she has simply arrived a few minutes early, and the operator may decide that the alarm handling workflow (205) is unnecessary, and not contact the user (103).

An embodiment using a schedule/calendar data (509) may be particularly useful in situations involving contractors, such as home cleaning services, babysitters, pet walking or grooming services, visiting relatives, or separated families where one parent retrieves or drops off children from the home of another. In such circumstances, the visiting person is generally not granted unlimited access to the home, and being present in the home at unexpected times or dates is an intrusion.

In an embodiment, a person depicted in the video stream (505) may be classified as an intruder. By way of example and not limitation, when the camera (110) detects the entrance of the person, an alarm is triggered and the video stream (505) is viewed at the call center (113). The facial recognition module (501) is unable to match the person to any photographs (507) of authorized persons, and flags the person as a potential intruder. The operator may then contact the user (103) to ask whether anybody is authorized to be in the home, and may have a brief discussion to try to identify the intruder, such as by describing the person and what he or she is doing. This may help to eliminate simple mistakes, such as where the user (103) forgot that a neighbor was coming over to borrow something. If the result of the verification step is that the user (103) does not know who the person is, the operator may then flag the person as an intruder and escalate the emergency to the PSAP (115) for an emergency response in the nature of a trespass.

In such a situation, the video stream (505) data of the intruder has also been effectively classified, providing training data for the facial recognition module (501). The video data (505) may be added to the training or source data (503) and the person depicted may be classified as an intruder with respect to the user's (103) residence. In the future, this information can be used to identify this person as a potential intruder in other residences. For example, suppose a second user (103) also has a camera (110) in his or her residence, and the same intruder breaks into the second user's (103) home. When the video feed (505) for the second user (103) is received at the call center, the face of the intruder may be detected in the video feed (505) and matched to the prior video data (505) of the same person from the first alarm, in which instance the detected person was categorized as an intruder.

This prior categorization may be used to automatically categorize the same person depicted in the second video feed (505) as an intruder based on the prior categorization. In this manner, regardless of whether the two users (103) know each other, or even use the same camera (110) or home security system company, the second user (103) can benefit from the knowledge gained from the first user (103). If the second user (103) likewise confirms that the person in question is an intruder, this information can again be provided back to the training data (503), and the confidence score associated with categorizing the detected person as an intruder may be increased.

In an embodiment, this confidence score may be used to determine whether the alarm handling workflow (205) should be altered or shortened, such as by skipping the confirmation step and proceeding directly to categorize the intruder as a trespasser and notify the PSAP (115). In such an embodiment, the operator may still contact the user (103)

for safety purposes, such as to warn the user not to come home, but the notification to the PSAP (115) may happen regardless to dispatch a first responder (117) as soon as possible without the intervening delay of the confirmation step. Additionally, automatic notifications can be sent to other nearby users (103) to warn them of an on-going break-in nearby and remind them to lock their doors and windows and be vigilant.

In a still further embodiment, the dates, times, and locations associated with detection of such an intruder may be used as behavioral forensic data to predict the next intrusion or probable location of the intruder. For example, if the break-ins tend to take place in a same general area around the same time, law enforcement may be informed, and dispatch additional patrols. Also, users (103) whose residences are in the area may be notified and reminded to lock their doors and windows and be vigilant.

In a still further embodiment, persons shown in such video streams (505) may be further classified based on other external data sources (511), such as a database of arrest photos (colloquially known as mug shots) of known criminals or suspects. This external data (511) may also comprise data indicating the types of crimes associated with the intruder, which may impact the confidence score. For example, if the person has been repeatedly arrested for breaking and entering, that may increase the confidence that the person is an intruder. However, if the person has only one arrest for an unrelated infraction, the confidence score might not be altered based on the arrest history.

Other actors in the depicted system (101) may also provide categorization and training data in similar fashion. For example, once first responders (117) arrive, if the detected person is apprehended and charged, this information may be further provided to the training data (503) to increase the confidence score that the person in question is an intruder.

In a still further embodiment, the same technique may be used with data other than video or image data. By way of example and not limitation, most people now carry a mobile device on their person throughout the day. Even a criminal breaking into a home may have one. Mobile devices engage in background network activity as an incident of their normal and ordinary operation under wireless networking protocols, seeking out wireless devices such as wireless routers or access points for networks to join. During this process, certain information about the mobile device is received by the wireless routers or access points, such as hardware addresses, which are generally unique.

This information could also be used to identify an intruder. That is, the list of hardware addresses for devices detectable by a wireless router or access point at the time of the intrusion most likely includes the intruder's device, even if the intruder does not join the wireless network. These addresses could be filtered to remove known devices (similar to using photographs to identify authorized guests), and any unrecognized addresses can be included in the alarm data transmitted to the case management server (111). The case management server may then keep a record of such unknown device addresses, and the users (103) associated with them (e.g., the users (103) whose home network detected the unrecognized device), and possibly also address or location where the unrecognized device was seen in connect with an intruder.

If the same hardware address is later detected in connection with a different intruder or incident, the probability that the intruder is the same person is very high, and the confidence score in identifying the intruder may be increased accordingly. This technique can also be used to cross-reference multiple independent detections and eliminate other unrecognized devices that are not repeated in subsequent intrusions.

These techniques can also implement the various features described herein with respect to the use of video stream (505) data, including, but not limited to, a whitelist feature in which the user (103) provides and updates data about authorized guests (e.g., their wireless hardware addresses), a calendaring system to define when specific users (e.g., devices) are authorized to be in the residence, using visual indicators in the interface to quickly identify suspicious individuals, displaying the confidence score and basis thereof, and using the history of detections of the device for behavioral forensic purposes. These techniques may also be used in conjunction with the video stream (505) techniques described herein to provide an even more confident automatic detection of intruders.

In a still further embodiment, a potential intruder may be categorized based on user (103) behavior, intruder behavior, or other authentication or access events. By way of example and not limitation, if an alarm is triggered but the user (103) dismisses it, it may be inferred that the depicted individual in the alarm is an authorized guest. The video stream (505) of that person may then be cropped to facial data, used to train the facial recognition module (501) along with the implied classification, and added to the data store (503). Similarly, if the potential intruder is carrying a wireless device which authenticates on the user's (103) local Wi-Fi network (112), it may be inferred that because the person knows the Wi-Fi password for the network, the person is known to the user (103) and not an intruder. Similarly, if the video data (505) shows the user (103) in the video frame with the potential intruder and disables the alarm, it may be inferred that the additional person is not considered an intruder by the user (103). These inferences may be used increase the confidence score of the categorization of a given person based on either presence in the video stream (505) or a detected wireless hardware address.

In a still further embodiment, the system (101) may be trained using still other external data sources (511). By way of example and not limitation, public records, such addresses and dates in a police blotter, may be cross-referenced to the locations and dates of alarms received at the case management server (111) to infer an outcome. If a police officer was dispatched, for example, it is more likely that the alarm was a true intruder.

In an embodiment, the systems and methods may comprise a more general classification engine that attempts to automatically identify true emergencies and false alarms, referred to herein as a general emergency classification module (513). The schematic diagram depicted in FIG. 5 provides a general overview of this system (101), except that in this embodiment, the AI (501) are not limited to facial recognition, but rather are broader, having been trained on broader set of training data to provide different types of classification (which may also include the facial recognition techniques described elsewhere herein). By way of example and not limitation, a general emergency classification module (513) may be trained to classify alarm data as a real emergency or a false alarm, also providing confidence scores for each. This may be based on an analysis of some or all data received or made available at the case management server (111) in connection with a triggered alarm. Examples of such data include video stream (505) data, image data, device data, audio data, and health information associated with the user (103), location data, text message data, and the like. These and other types of alarm data are also described in U.S. Pat. Nos. 10,278,050, 10,728,732, and 10,560,831. Additionally, and/or alternatively, the general emergency classification module (513) may attempt to identify the type of emergency, again based on using a trained artificial intelligence (501) and applying alarm data to it.

The general emergency classification module (513) may be trained using a number of techniques. By way of example and not limitation, the general emergency classification module (513) may be trained using any of the techniques described herein with respect to facial recognition and/or hardware address detection. In an embodiment, the general emergency classification module (513) may be trained using additional external data sources (511). These may be, for example, location data for the user (103). During an alarm handling workflow, the case management server (111) generally receives real-time location data with respect to the mobile device (105) (or wearable device (106), as the case may be). These locations can be cross-referenced to known locations of facilities associated with an emergency, such as a police station, fire station, hospital, or other medical center. If the mobile device (105) is detected at a police station, it may be inferred that the situation involved a law enforcement emergency. Likewise, if the mobile device (105) is detected at a medical center, it may be inferred that the situation involved a health emergency. Such data may be used to train the general emergency classification module (513) to recognize the type of emergency based on the alarm data, and to then classify future emergencies. Again, such classifications may be displayed or visualized to the call center (113) operator to efficiently convey the likely nature of the emergency. Additionally, the user (103) or operator may also provide classification data.

In a still further embodiment, inferences may be drawn from patterns of user (103) behavior observed over time to establish a typical or normal user (103) routine, and to then use unexpected variances from that routine as an indication of a potential emergency, attempt to circumvent the system (101), or to identify likely false alarms. Such user (103) behavior may be physical behavior observed in video data (505), but is more easily implemented with reference to specific interactions with the technology environment, especially Internet-of-things devices, smart home devices, and the like, where user (103) interactions are easily and definitively detected. Examples include behaviors such as arming or disarming security systems, turning lights on or off, locking doors, changing environmental setting such as temperature or activing a humidifier, triggering a motion sensor, operating televisions, smart speakers, personal assistant devices, connecting to the residential Wi-Fi (112) network, running an automated vacuum or other household tool, the length of time it takes to perform certain actions or the amount of time that transpires between actions, and so forth.

By way of example and not limitation, suppose a user (103) has a routine upon returning home of entering through a particular door, joining the Wi-Fi (112) network with her mobile device (105), turning on a smart light near the door, and usually, but not always, disarming the home security system shortly before its 30 second timer expires. This pattern is observed over a particular period of time and is associated with a probability or frequency score, depending on how consistently the user (103) performs these steps in this order. The pattern may also be examined to identify elements performed less consistently. For example, the user (103) may frequently forget to disarm the system on time, meaning that this element of the routine has a lower frequency score associated with it, although the rest of the routine is performed consistently.

On a particular occasion, if the user (103) fails to disarm the system on time, the history of behavior suggests that this behavioral change has low predictive power in terms of whether the resulting alarm trigger is an emergency or a false alarm because this user (103) frequently fails to disarm on time and, when she does, the security system is almost always disarmed at the very end of its timer. However, if the user (103) enters through a different door and immediately disarms the system, this is very unusual behavior and may be an indication of a true emergency, such as an unseen intruder forcing the user (103) to disable the alarm system. In such circumstances, the alarm may trigger regardless, resulting in the call center (113) seeking to confirm safety. The user's (103) behavior in response to that attempt may further indicate trouble, even if the user (103) indicates safety. For example, if the user (103) typically confirms safety within a few seconds and includes a happy emoji and a "thank you" message, but in response to this confirmation responds more slowly or with only a "yes," the call center (113) may escalate to a PSAP (115) regardless, based on the unexpected change in behavior.

Such inferences could also be drawn from user (103) behavior with respect to a mobile device (105) or wearable device (106). For example, if the user (103) consistently takes the same route home from work or school, and an alarm is triggered while the user (103) is on an unusual, different route, this may be an indication that the user (103) is experiencing a true emergency. Such inferences could also be drawn from user (103) behavior based on biometric data. For example, if the user's (103) pulse is consistently with a given range during the day, or during a commute, but is found to be elevated when an alarm is triggered, this may be an indication that the user (103) is experiencing a true emergency. These and other factors may be weighted and/or used in combination to assess the circumstances and attempt to classify the nature of an alarm (emergency or false alarm), the type of emergency.

Also described herein are systems and methods for automatically determining an emergency contact. As on-line service platforms expand and interconnect into broader ecosystems (referred to herein as an "emergency response platform"), users (103) have the ability to share a wide amount of data about themselves, their relationships, their routines, and their technology, which can be used to make the emergency response process faster and more efficient. Further, social networking concepts can be used to identify friends, family, neighbors, and other trusted persons with whom personal information may be shared during an emergency to notify the right people and hasten response times. This may be done by the user (103) manipulating an interface on a user device (e.g., the mobile device (105), a wearable device (106), or a residential computer (110)) to enter the contact information for such trusted contacts, along with other information, such as the contact's relationship to the user (103), age, phone number, e-mail address, residential address, occupation, type of emergency contact (e.g., health, crime, fire) and other personal details. In an embodiment, the contact may be notified that the contact is being included in the user's (103) emergency response network, and may have the ability to opt-in or opt-out of participating, to update or supplemental the information provided by the user, and/or to select what messages the contact receives, and what information about the contact is shared with the emergency response platform. A similar technique may be used to set up other configurations described elsewhere herein.

In an embodiment, this information can be used to provide notifications to key contacts while minimizing false alarms and disruption. Continuing the foregoing example of a suspected home intruder, if the intruder is classified as a likely intruder, the list of contacts for the user (103) may be examined, and the available location data for those contacts may be compared to the location of the user's (103) residence where the intrusion is occurring. Those contacts may then be notified (e.g., via a text message, message via a system notification, e-mail, phone call, etc.) of the incident and instructed to avoid the residence for safety. Likewise, contacts who are found to be in the residence may be given instructions to leave or take other emergency precautions.

This information can also be used to provide more data and information to emergency responders (117). By way of example and not limitation, if a fire is detected, location data of contacts, such as family members, can be consulted to estimate how many members of the household were in the house when the fire began by comparing the last known locations of their mobile devices to the location of the residence that triggered the fire alarm. While it is possible that devices were left behind while fleeing the home, the count of such devices may be used to provide an automatic count the number of occupants whose safety should be confirmed. Additionally, messages can be sent to each such person to confirm safety, and as confirmation is received, the list of potential occupants can be updated to real-time on the rapid-response interface until all persons are accounted for. Again, this information is available not only to the call center (113) operator, but also the PSAP (115) and first response team (117).

These techniques may be used in other circumstances as well, and may be used in combination with still other techniques also described herein, such as drawing inferences about which contact to notify. This may be done by reference to, without limitation, the types of emergencies for which the contact is registered or associated with the user (103) in the user's (103) emergency notification network, the nature of the emergency (as provided in the alarm data or inferred from other information), and the physical proximity of each contact to the location of the emergency.

By way of example and not limitation, if a user (103) is in a vehicular accident, the vehicular telematics system may effectively be the computer (110) that triggers the alarm, and may provide information about vehicle location, airbag deployment, and/or may have a cabin camera that can be activated to provide a video stream (505) of the occupants. The location of the accident and nature of the emergency (health/vehicle accident) may be shared with the contacts in the user's (103) emergency response network whose mobile devices are detected as being closest to the site of the accident. Further, if the user (103) is taken to a hospital, the user's (103) location can be tracked via the mobile phone (105), and, again, the system (101) may infer from the mobile device (105) being at a hospital that the user (103) is experiencing a health emergency and may likewise notify contacts in the user's (103) emergency response network whose mobile devices are detected as being closest to the site of the hospital. If a contact indicates unavailability, other contacts may be notified. In a still further embodiment, contacts may provide, or allow access to, personal calendars or schedules, which can be also be used to determine whether a given contact should be notified. If, for example, the closest contact is currently indicated as busy due to a scheduled appointment, that contact may be skipped in favor of another, non-busy contact, or both may be notified.

In a still further embodiment, it is often the case that different emergency contacts for a given person do not know each other. In an embodiment, the emergency response network for the user (103) may provide such contacts the ability to communicate with and find each other, such as by providing group text services, group voice or video conferences services, or the ability to share locations or contact information. This facilitates the ability of the user's (103) extended social network to combine efforts to respond to and help the user (103) in an emergency.

Also described herein are systems and methods for automatically determining the presence of first responder (117). As described elsewhere herein, most people, including first responders (117), carry personal devices that emit radio communications over wireless protocols, and even if those devices do not connect to a particular network, information about the devices is incidentally received by the access points (112) to those networks, such as the wireless hardware address of the device. Just as this device can be tracked to sort guests from intruders as described elsewhere herein, they can also be tracked to identify known first responders (117) and thereby infer the presence of a first responder (117). Further, many emergency response vehicles, such as police cars, fire trucks, an ambulances, include other radio communications equipment, whose presence can be passively detected in this fashion.

In an embodiment, the presence (or absence) of a first responder (117) at a particular location can be detected or inferred by detecting the presence of passive radio signals from devices carried by the first responders (117) or emitted by their vehicles or equipment. The arrival and departure times can also be inferred or estimated based on when such signals are first and last received. This information can be used for multiple purposes, including, without limitation, indicating the presence or absence of a first responder (117) at the location of the emergency in the rapid-response interface (305) to share real-time data with PSAPs (115) and/or first responder dispatchers (117), to assure the user (103) that the person offering assistance is a true first responder (for example, an off-duty police officer or medic who stops to help), evaluating response timing (such as for performance evaluation), and providing forensic information or other evidence in examining performance or confirming police reports or other accounts of the events that transpired, and so forth. Additionally, all of the data about an incident that is collected may be stored in a case record and provided to an insurance adjuster to provide evidentiary factual support to prove (or disprove) an insurance claim.

The systems and method may also have the ability to utilize information or data from other users (103) in the network to augment the information available from any one user (103). This is because, due to the division of work between the alarm triggering workflow (203) and the alarm handling workflow (205), multiple different alarm systems, which need not have any technological relationship or ability to communicate directly with each other, may nevertheless be utilized to manage a given case.

For example, suppose a smart doorbell (110) detects the presence of a potential intruder passing in front of a home, but the person has walked out of the view of the camera (110). The call center (113) operator may be able to consult a listing of other subscribers (103) or customers (103) in the neighborhood who have security cameras (110) to determine if any are facing towards the user's (103) home and could be activated to get an additional view and potentially identify the person, or observe what the person is doing. This could also be done with respect to mobile devices, vehicular cameras, and the like.

The systems and method described herein are generally capable of being carried out using the depicted network topology. In some cases, the described functionality, by its nature, would be carried out by software installed on a user device, such as a mobile device (105), wearable device (106), or residential computer (110), or another similar system in communication with such devices, but generally it is preferable that the functionality be implemented in the alarm handling workflow (205) where possible. This allows for the accumulation of training data and information in a centralized location for the benefit of all users (103), regardless of the type of alarm or technology they use.

In some embodiments, the alarm handling workflow (205) may be invoked on a non-emergency basis for purposes of providing training data. For example, mock alarm data may be prepared and submitted to the case management server (111), but with a flag or other data indicator that the submission is for non-emergency training purposes. Examples of such uses may be that the user (103) wishes to provide training data, such as video (505) or photographs (507), to help train the system to recognize specific people or even pets. For example, the user (103) may configure the system to send video clips (505) of the user or his or her children leaving or returning home as non-emergency training submissions. Likewise, the user (103) may configure the system to send video clips (505) of suspicious activity, such as smart doorbell (110) or security camera (110) video (505) of unexpected or suspicious visitors, and flag this as non-emergency training data representing intruders, or situations the user (103) would prefer the system categorize as a true emergency. In a still further embodiment, this process may be gamified, and the user (103) may be presented with an interface involving gameplay elements in which the user (103), in the process of interacting with the elements and playing the game, is effectively classifying alarm data and thereby providing training data.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

Throughout this disclosure, various technological and other terms may be used. The following paragraphs provide guidance on the application and interpretation of these terms in general, but a person of ordinary skill in the art will understand that these and other terms in computers and telecommunications are often used in a casual and imprecise manner, especially when used colloquially or informally. The proper definition may vary contextually, and may not necessarily be identical to how these terms are used colloquially or even in other technical fields.

The term "computer" means a device or system that is designed to carry out a sequence of operations in a distinctly and explicitly defined manner, usually through a structured sequence of discrete instructions. The operations are frequently numerical computations or data manipulations, but also include input and output. The operations with the sequence often vary depending on the particular data input values being processed. The device or system is ordinarily a hardware system implementing this functionality using digital electronics, and, in the modern era, the term is most closely associated with the functionality provided by digital microprocessors. The term "computer" as used herein without qualification ordinarily means any stored-program digital computer, including any of the other devices described herein which have the functions and characteristics of a stored-program digital computer.

This term is not necessarily limited to any specific type of device, but instead may include computers, such as, but not necessarily limited to: processing devices, microprocessors, controllers, microcontrollers, personal computers, desktop computers, laptop computers, workstations, terminals, servers, clients, portable computers, handheld computers, cell phones, mobile phones, smart phones, tablet computers, server farms or clusters, hardware appliances, minicomputers, mainframe computers, video game consoles, handheld video game products, smart watches, and the like. It will also be understood that certain devices not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, printers (which often have built-in server software), file servers, NAS and SAN, and other hardware capable of interacting with the systems and methods described herein in the matter of a computer.

A person of ordinary skill in the art will also understand that the generic term "computer" is often used to refer to an abstraction of the functionality provided by a computer, and is generally assumed to include other elements, depending on the particular context in which the term is used. By way of example and not limitation, a laptop "computer" would be understood as including a pointer-based input device, such as a mouse or track pad, in order for a human user to interact with an operating system having a graphical user interface. However, a "server" computer may not necessarily have any directly connected input hardware, but may have other hardware elements that a laptop computer usually would not, such as redundant network cards, power supplies, or storage systems.

A person of ordinary skill in the art will also understand that functions ascribed to a "computer" may be distributed across a plurality of machines, and that any such "machine" may be a physical device or a virtual computer. A person of ordinary skill in the art will also understand that there are multiple techniques and approaches for distribution of processing power. For example, distribution may be functional, as where specific machines in a group each perform a specific task (e.g., an authentication machine, a load balancer, a web server, an application server, etc.). By way of further example, distribution may be balanced, such as where each machine is capable of performing most or all functions of any other machine and is assigned tasks based on resource availability at a point in time. Thus, the term "computer" as used herein, can refer to a single, standalone, self-contained device, a virtual device, or to a plurality of machines (physical or virtual) working together or independently, such as a server farm, "cloud" computing system, software-as-a-service, or other distributed or collaborative computer networks.

The term "program" means the sequence of instructions carried out on a computer. Programs may be wired or stored, with programs stored on a computer-readable media being more common. When executed, the programs are loaded into a computer-readable memory (e.g., random access memory) and the program's instructions are then provided to a central processing unit to carry out the instructions.

The term "software" is a generic term for those components of a computer system that are "intangible" and not "physical." This term most commonly refers to programs executed by a computer system, as distinct from the physical hardware of the computer system, though it will be understood by a person of ordinary skill in the art that the program itself does physically exist. The broad term "software" encompasses both system software-essential programs necessary for the basic operation of the computer itself—as well as application software, which is software specific to the particular role performed by a computer. The term "software" thus usually implies a collection or combination of multiple programs for performing a task, and includes all forms of the programs-source code, object code, and executable code. The term "software" may also refer generically to a specific program or subset of program functionality relevant to a given context. For example, on a smart phone, a single application may be out of date and requiring updating. The phrase "update the software" in this context would be understood as meaning download and install the current version of the application in question, and not, for example, to update the operating system. However, if a new version of the operating system was available, the same phrase may refer to the operating system itself, optionally with any application programs that also require updating for compatibility with the new version of the operating system.

For purposes of this disclosure, "software" can include, without limitation and as usage and context requires: programs or instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers.

The term "media" means a computer-readable medium to which data may be stored and from which data may be retrieved. Such storage and retrieval may be accomplished using any number of technical means, including, without limitation, electronic, magnetic, optical, electromagnetic, infrared, or semiconductor systems, apparatus, or devices. Various types of media are commonly present in a computer, including hard disks, random access memory (RAM), read-only memory (ROM), erasable programmable read-only memory (EPROM or Flash memory), as well as portable media such as diskettes, compact discs, thumb drives, and the like. It should be noted that a computer readable medium could, in certain contexts, be understood as including signal media, such as a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, except and unless specifically qualified otherwise, the term "media" should be understood as excluding signal media and referring to tangible, non-transitory, computer-readable media.

The term "network" is susceptible of multiple meanings depending on context. In communications, the term generically refers to a system of interconnected nodes configured for communication (e.g., exchanging data) with each other, such as over physical lines, wireless transmission, or a combination of the two. In computing, networks are usually collections of computers and special-purpose network devices, such as routers, hubs, and switches, exchanging data using various protocols. The term may refer to a local area network, a wide area network, a metropolitan area network, or any other telecommunications network. When used without qualification, the term should be understood as encompassing any voice, data, or other telecommunications network over which computers communicate with each other. This meaning should be understood as being distinct from the term "network" in mathematics, in which case it refers to a graph or set of objects, nodes, or vertices connected by edges or links. For example, a "neural network" in computer science uses the mathematical meaning, not the communication meaning, though there is some self-evident high-level conceptual overlap between the two.

The term "server" means a system on a network that provides a service to other systems connected to the network. The meaning of this term has evolved over time and at one time referred to a specific class of high-performance hardware on a local area network, but the term is now used more generally to refer to any system providing a service over a network.

The term "client" means a system on a network that accesses, receives, or uses a service provided by a server connected to the network.

The terms "server" and "client" may refer to hardware, software, and/or a combination of hardware and software, depending on context. Those having ordinary skill in the art will appreciate that the terms "server" and "client" in network theory essentially mean corresponding endpoints of network communication or network connections, typically (but not necessarily limited to) a socket. Those having ordinary skill in the art will further appreciate that a "server" may comprise a plurality of software and/or hardware servers working in combination to delivering a service or set of services. Likewise, a "client" may be a device accessing a server, software on a client device accessing a server, or (most often) both. Those having ordinary skill in the art will further appreciate that the term "host" may, in noun form, refer to an endpoint of a network communication or network (e.g., "a remote host"), or may, in verb form, refer to a server providing a service over a network ("host a website"), or an access point for a service over a network.

The terms "cloud" and "cloud computing" and similar terms refers to the practice of using a network of remote servers hosted and accessed over the Internet to store, manage, and process data, rather than local servers or personal computers.

The terms "web," "web site," "web server," "web client," and "web browser" refer generally to computers programmed to communicate over a network using the HyperText Transfer Protocol ("HTTP"), and/or similar and/or related protocols. A "web server" is a computer receiving and responding to HTTP requests, and a "web client" is a computer having a user agent sending, and receiving responses to, HTTP requests. The user agent is generally web browser software. Web servers are essentially a specific type of server, and web browsers are essentially a specific type of client.

The term "real-time" refers to computer processing and, often, responding or outputting data within sufficiently short operational deadlines that, in the perception of the typical user, the computer is effectively responding immediately after, or contemporaneously with, a reference event. For example, online chats and text messages are regarded as occurring in "real-time" even though each participant does not receive communications sent by the other instantaneously. Thus, real-time does not literally require instantaneous processing, transmission and response, but rather responses that invoke the feeling of immediate or imminent interactivity within the human perception of the passage of time. How much actual time may elapse will vary depending on the operational context. For example, where the operational context is a graphical user interface, real-time normally implies that the interface responds to user input within a second of actual time, milliseconds being preferable. However, in the context of a network, where latency and bandwidth availability may fluctuate from one moment to another beyond the control of either participant, a system operating in "real time" may exhibit longer delays.

The term "user interface" or "UI" means the elements of interfaces for providing user input to, and receiving output from, a computer. These interfaces are traditionally graphical in nature, traditionally referred to as "graphical user interfaces" or "GUIs," but other types of UI designs are becoming more commonplace, including gesture- and voice-based interfaces. The design, arrangement, components, and functions of a UI will necessarily vary from device to device and from implementation to implementation depending on, among other things, screen resolution, processing power, operating system, input and output hardware, power availability and battery life, device function or purpose, and ever-changing standards and tools for user interface design. One of ordinary skill in the art will understand that graphical user interfaces generally include a number of visual control elements (often referred to in the art as "widgets"), which are usually graphical components displayed or presented to the user, and which are usually manipulable by the user through an input device (such as a mouse, trackpad, or touch-screen interface) to provide user input, and which may also display or present to the user information, data, or output.

The terms "artificial intelligence" and "AI" refers broadly to a discipline in computer science concerning the creation of software that performs tasks requiring the reasoning faculties of humans. In practice, AIs lack the ability to engage in the actual exercise of reasoning in the manner of humans, and AIs might be more accurately described as "simulated intelligence." This "simulated intelligence" effect is contextual, and usually narrowly confined to one, or a very small number, of well-defined tasks (such as recognizing a human face in an image). A common implementation of AI is supervised machine learning wherein a model is trained by providing multiple sets of pre-classified input data, with each set representing different desired outputs from the AI's "reasoning" (e.g., one set of data contains a human face, and one set doesn't). The AI itself is essentially a sophisticated statistical engine that uses mathematics to identify and model data patterns appearing within one set but, generally, not the other. This process is known as "training" the AI. Once the AI is trained, new (unclassified) data is provided to it for analysis, and the software assesses, in the case of a supervised machine learning model, which label best fits the new input and often also provides a confidence level in the prediction. A human supervisor may provide feedback to the AI as to whether it was right or not, and this feedback may be used by the AI to refine its models further. In practice, adequately training an AI to operate in a real-world production environment requires enormous sets of training data, which are often difficult, laborious, and expensive to develop, collect, or acquire. Each discrete task that an AI is trained to perform may be referred to herein as a "model."

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method comprising:

by an alarm processing system that a) comprises one or more computers and communicates with at least a responder system and a property system for a property using a network and b) that executes an alarm handling workflow to process data for alarm events:

receiving, from the property system and using the network, data identifying a potential alarm event at the property;

creating, in memory, an alarm event data record that includes first data for the potential alarm event and a case identifier;

determining, for the potential alarm event for the property and using sensor data for the potential alarm event, whether to process the potential alarm event using a default alarm handling workflow or an enhanced alarm handling workflow;

in response to determining to process the potential alarm event using the enhanced alarm handling workflow, modifying the default alarm handling workflow that has a plurality of operations to generate the enhanced alarm handling workflow that has one or more operations, the plurality of operations including at least one operation not included in the one or more operations;

after generating the enhanced handling alarm workflow, executing the enhanced alarm handling workflow to generate second data;

in response to determining to process the potential alarm event using the enhanced alarm handling workflow, updating the alarm event data record to include the second data for the enhanced alarm handling workflow; and transmitting, to the responder system and using the network, third data for the potential alarm event including the case identifier to enable a device to access a user interface that depicts alarm data for the alarm event data record.

2. The method of claim 1, wherein determining whether to process the potential alarm event using the default alarm handling workflow or the enhanced alarm handling workflow comprises:

determining whether to process the potential alarm event using i) the default alarm handling workflow or ii) the enhanced alarm handling workflow that reduces a number of operations performed for the potential alarm event compared to the default alarm handling workflow, the method comprising:

in response to determining to process the potential alarm event using the enhanced alarm handling workflow, determining to skip one or more operations that would have been performed for the default alarm handling workflow.

3. The method of claim 1, wherein determining whether to process the potential alarm event using the default alarm handling workflow or the enhanced alarm handling workflow comprises:

analyzing, using one or more artificial intelligence models, the sensor data to determine a confidence score that the sensor data represents an actual alarm event;

determining whether the confidence score satisfies a confidence threshold; and determining whether to process the potential alarm event using the default alarm handling workflow or the enhanced alarm handling workflow using a result of the determination whether the confidence score satisfies the confidence threshold.

4. The method of claim 3, wherein:

the one or more artificial intelligence models comprise at least one of a facial recognition model, an authentication module, a behavior pattern model, an emergency type model, or a device identification module; and determining whether to process the potential alarm event using the default alarm handling workflow or the enhanced alarm handling workflow uses the result of the determination whether the confidence score that was generated using the at least one of the facial recognition model, the authentication module, the behavior pattern model, or the device identification module satisfies the confidence threshold.

5. The method of claim 3, comprising:

after determining whether to process the potential alarm event using the default alarm handling workflow or the enhanced alarm handling workflow, receiving feedback indicating an accuracy of at least one model from the one or more artificial intelligence models; and in response to receiving the feedback, training the at least one model from the one or more artificial intelligence models using the feedback indicating the accuracy.

6. The method of claim 1, comprising:

detecting representations of one or more people in the sensor data for the potential alarm event; and determining, for each of at least some of the one or more people in the sensor data, whether the respective person is likely authorized to be at the property, wherein:

updating the alarm event data record to include data for the enhanced alarm handling workflow comprises updating the alarm event data record to include data that indicates, for at least some of the one or more people, whether the person is likely authorized to be at the property.

7. The method of claim 6, comprising:

providing, to the device, instructions to cause the device to present the user interface that depicts, for the at least some of the one or more people, information about the person and a label that indicates whether the person is likely authorized to be at the property.

8. The method of claim 6, comprising:

providing, to the device, instructions to cause the device to present the user interface that depicts, for a person detected as being represented by the sensor data, an image determined to be a best match image of the person.

9. The method of claim 1, comprising:

determining an emergency type for the potential alarm event;

updating the alarm event data record to include data for the emergency type for the potential alarm event; and causing, using the updated alarm event data record, presentation of a second user interface that includes second data for the potential alarm event including the emergency type.

10. The method of claim 1, wherein modifying the default alarm handling workflow comprising:

selecting, from the plurality of operations for the default alarm handling workflow that includes one or more first operations and one or more second operations, the one or more second operations to skip; and generating the enhanced alarm handling workflow that includes the one or more first operations and does not include the one or more second operations.

11. A system comprising one or more computers and one or more storage devices on which are stored instructions that are operable, when executed by the one or more computers, to cause the one or more computers to perform operations comprising:

receiving, from a property system for a property and using a network, data identifying a potential alarm event at the property;

creating, in memory, an alarm event data record that includes first data for the potential alarm event and a case identifier;

determining, for the potential alarm event for the property and using sensor data for the potential alarm event, whether to process the potential alarm event using a default alarm handling workflow or an enhanced alarm handling workflow;

in response to determining to process the potential alarm event using the enhanced alarm handling workflow, detecting representations of one or more people in the sensor data for the potential alarm event;

determining, for each of at least some of the one or more people in the sensor data, whether the respective person is likely authorized to be at the property;

updating the alarm event data record a) that includes the first data for the potential alarm event and the case identifier b) to include second data for the enhanced alarm handling workflow including data that indicates, for at least some of the one or more people, whether the person is likely authorized to be at the property; and transmitting, to a responder system and using the network, third data for the potential alarm event including the case identifier to enable a device to access a user interface that depicts alarm data for the alarm event data record.

12. The system of claim 11, wherein determining whether to process the potential alarm event using the default alarm handling workflow or the enhanced alarm handling workflow comprises:

determining whether to process the potential alarm event using i) the default alarm handling workflow or ii) the enhanced alarm handling workflow that reduces a number of operations performed for the potential alarm event compared to the default alarm handling workflow, the operations comprising:

in response to determining to process the potential alarm event using the enhanced alarm handling workflow, determining to skip one or more operations that would have been performed for the default alarm handling workflow.

13. The system of claim 11, the operations comprising:

providing, to the device, instructions to cause the device to present the user interface that depicts, for the at least some of the one or more people, information about the person and a label that indicates whether the person is likely authorized to be at the property.

14. The system of claim 11, the operations comprising:

providing, to the device, instructions to cause the device to present the user interface that depicts, for a person detected as being represented by the sensor data, an image determined to be a best match image of the person.

15. The system of claim 11, the operations comprising:

determining an emergency type for the potential alarm event;

updating the alarm event data record to include data for the emergency type for the potential alarm event; and causing, using the updated alarm event data record, presentation of a second user interface that includes second data for the potential alarm event including the emergency type.

16. One or more non-transitory computer storage media encoded with instructions that, when executed by one or more computers, cause the one or more computers to perform operations comprising:

receiving, from a property system for a property and using a network, data identifying a potential alarm event at the property;

creating, in memory, an alarm event data record that includes first data for the potential alarm event and a case identifier;

determining, for the potential alarm event for the property and using sensor data for the potential alarm event, whether to process the potential alarm event using a default alarm handling workflow or an enhanced alarm handling workflow;

in response to determining to process the potential alarm event using the enhanced alarm handling workflow, detecting representations of one or more people in the sensor data for the potential alarm event;

determining, for each of at least some of the one or more people in the sensor data, whether the respective person is likely authorized to be at the property;

updating the alarm event data record a) that includes the first data for the potential alarm event and the case identifier b) to include second data for the enhanced alarm handling workflow including data that indicates, for at least some of the one or more people, whether the person is likely authorized to be at the property; and transmitting, to a responder system and using the network, third data for the potential alarm event including the case identifier to enable a device to access a user interface that depicts alarm data for the alarm event data record.

17. The computer storage media of claim 16, wherein determining whether to process the potential alarm event using the default alarm handling workflow or the enhanced alarm handling workflow comprises:

determining whether to process the potential alarm event using i) the default alarm handling workflow or ii) the enhanced alarm handling workflow that reduces a number of operations performed for the potential alarm event compared to the default alarm handling workflow, the operations comprising:

in response to determining to process the potential alarm event using the enhanced alarm handling workflow, determining to skip one or more operations that would have been performed for the default alarm handling workflow.

18. The computer storage media of claim 16, the operations comprising:

generating the enhanced alarm handling workflow by modifying a first order of a plurality of operations for the default alarm handling workflow to have a second order, the second order including at least a first operation performed before a second operation, the first order including the second operation performed before the first operation.

* * * * *